United States Patent [19]

Ballance et al.

[11] Patent Number: 4,748,621
[45] Date of Patent: May 31, 1988

[54] TDMA/TDM INTERFACING

[75] Inventors: John W. Ballance; Steven J. Edwards, both of Ipswich, England

[73] Assignee: British Telecommunications public limited company, Great Britain

[21] Appl. No.: 929,326

[22] PCT Filed: Mar. 4, 1986

[86] PCT No.: PCT/GB86/00116

§ 371 Date: Oct. 17, 1986

§ 102(e) Date: Oct. 17, 1986

[87] PCT Pub. No.: WO86/05341

PCT Pub. Date: Sep. 12, 1986

[30] Foreign Application Priority Data

Mar. 4, 1985 [GB] United Kingdom ................. 8505516

[51] Int. Cl.⁴ ......................... H04B 7/24; H04B 7/185
[52] U.S. Cl. ........................................ 370/95; 370/104
[58] Field of Search ............................. 370/61, 95, 104

[56] References Cited

U.S. PATENT DOCUMENTS

| | | | |
|---|---|---|---|
| 3,643,031 | 2/1972 | Sasaki et al. | 370/104 |
| 4,298,979 | 11/1981 | Dobyns et al. | 370/104 |
| 4,319,352 | 3/1982 | Gupta et al. | 370/104 |
| 4,330,857 | 5/1982 | Alvarez, III et al. | 370/104 |
| 4,397,019 | 8/1983 | Alvarez et al. | 370/104 |
| 4,599,720 | 7/1986 | Kunzinger | 370/104 |
| 4,625,308 | 11/1986 | Kim et al. | 370/104 |
| 4,642,806 | 2/1987 | Hewitt et al. | 370/104 |
| 4,644,534 | 2/1987 | Sperlich | 370/104 |

OTHER PUBLICATIONS

ICC '83, Conference Record of the IEEE International Conference on Communications, vol. 1, 19–22 Jun. 1983, Boston, MA, IEEE, New York, S. Sasaki et al, "2 GHz Multi-Direction Time Division Multiplex Radio Equipment", pp. B2.2.1–B2.2.5.
ICC '77, International Conference on Communications, Pradman Kaul et al, "A Flexible Low Cost Interface Between TDMA Common Equipment and Multiple Terrestrial Extensions", Jun. 1977, pp. 45.6-205 to 45.6-208.
Fifth International Conference on Digital Satellite Communications, 23–26 Mar. 1981, Genoa, IT, IEEE, New York, T. Dobyns et al., "Simplified TDMA Terminal".
IEEE Transactions on Communications, vol. COM-26, No. 5, May 1978, IEEE, New York, W. L. Aranguren et al., "A Microprocessor Controlled Digital Interface for Satellite Systems", pp. 631–637.
ICC '83, Conference Record of the IEEE International Conference on Communications, vol. 3, 19–22 Jun. 1983, Boston, MA, IEEE, New York, Y. Manichaikul et al., "RAPAC-Apoint-to-Multipoint Digital Radio System for Local Distribution", pp. 1013–1016.
ICC '84, Conference Record of the IEEE International Conference on Communications, vol. 2, 14–17 May 1984, Amsterdam, IEEE, New York, M. T. Hewitt et al., "A Cost Effective 19 GHz Digital Multipoint Radio System for Local Distribution Applications", pp. 959–964.

Primary Examiner—Douglas W. Olms
Assistant Examiner—Melvin Marcelo
Attorney, Agent, or Firm—Nixon & Vanderhye

[57] ABSTRACT

An interface for connecting a station using a time division multiplex format to a time division multi-access system comprising (a) a first channel for converting time division multiplexed signals (112) into bursts (119), (b) a duplex channel for re-constituting bursts (117) into time division multiplex frames (111) and (c) TDMA circuitry for controlling (a) and (b) to operate in conformity with the TDMA. The first channel is preferably adapted to remove unused slots from the multiplex and to collect the used slots over several frames into a single burst. The duplex channel restores the frame format by replacing slots removed by the transmitter.

16 Claims, 3 Drawing Sheets

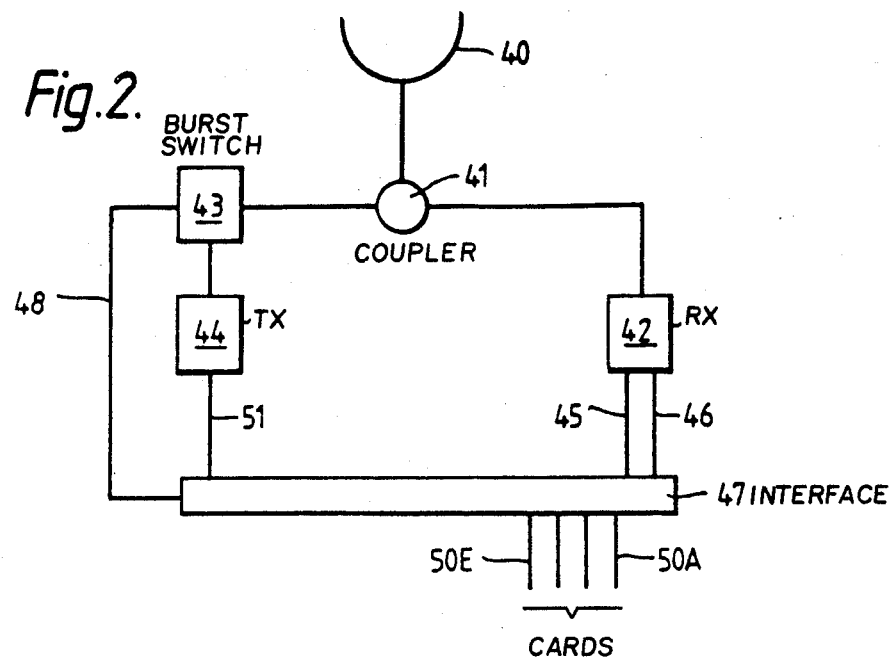
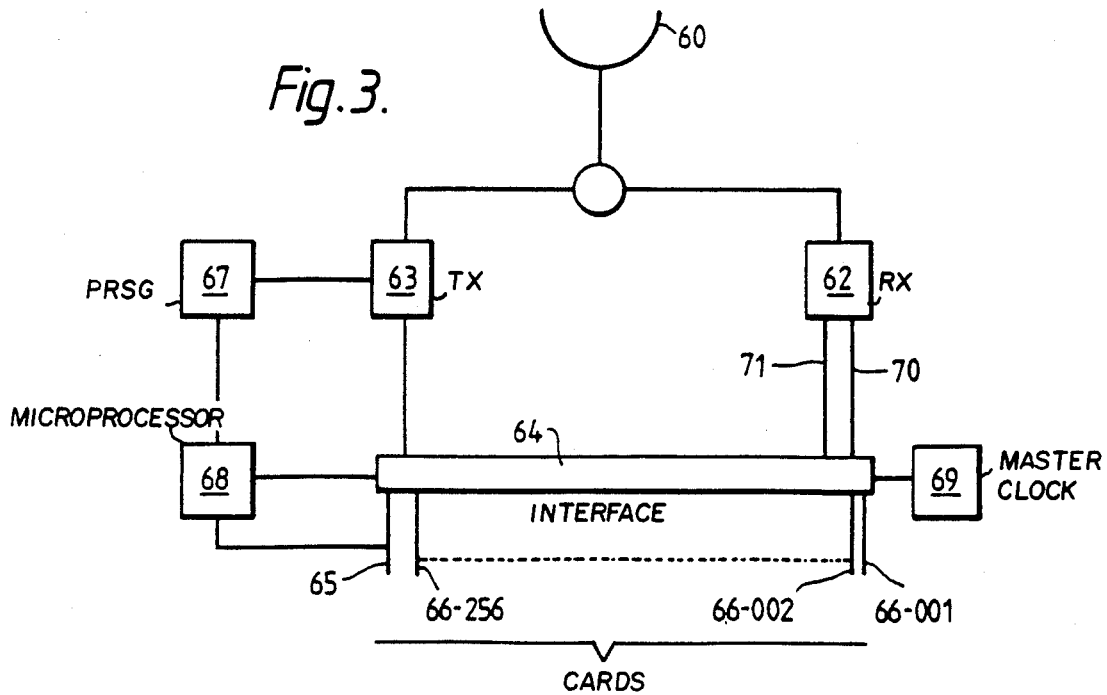

TDMA/TDM INTERFACING

FIELD OF THE INVENTION

This invention relates to a communications system, and interfaces therefor, in which a plurality of outstations use a single node as an intermediate for communications wherein said communications include at least a proportion of digital traffic in time division multiplexed form. The network may use two channels, e.g. two radio channels, both of which are used in a time-share mode.

The network comprising the outstations and the node will be called herein a "time-division multi-access", conveniently abbreviated to TDMA, system. The invention particularly relates to an interface circuit for interconnecting a TDMA system to an external station, i.e. one which is not part of the TDMA system, which station operates a plurality of channels in a time division multiplex format.

BACKGROUND AND SUMMARY OF THE INVENTION

The time division multiplex format commonly utilised in UK takes the form of a frame which provides time-slots for 30 digital channels, i.e. 30 traffic slots. In addition the frame has a slot, identified as "slot 0" for synchronisation and a "slot 16", i.e. the seventeenth in the sequence, which is used for signalling (that is indicating the start and end of calls and identifying numbers called to the exchange). Thus there are 32 slots in each frame.

It is also an accepted practice for a public "common carrier" of telecommunications to connect suitable customers to the public switched network via a multiplexed channel using the standard 32 slots even when the customer does not need the 30 channels provided by 30 slots. In those circumstances the operation is controlled so that only assigned slots are used.

The interface according to the invention is capable of operating with a wide range of external stations and, in particular, it is adaptable to whatever proportion of the multiplex frame is assigned to a particular external station.

A preferred interface means provides three functions; thus it comprises:
(a) A first channel for accepting digital signals in time division multiplex format and providing said signals to a TDMA;
(b) A duplex channel for re-constituting signals received via TDMA into an assigned time division multiplex format; and
(c) TDMA circuitry for participating in the operation of a TDMA system, said TDMA circuitry being operatively connected to items (a) and (b) above to provide synchronisation and compatability between the signals in said channels and the TDMA.

The first channel conveniently comprises gate-means for selecting defined slots from received frames, buffer means for storing said selected slots and burst forming means for concatenating TDMA information with the stored slots to produce a burst. The gate-means preferably comprises a frame-counter responsive to the sync slot in each frame of a received multiplexed signal wherein said frame-counter is operatively connected to a frame map store and a buffer input gate and a channel map store in such a manner that the frame-counter activates the buffer input gate to permit the passage of a byte when its count matches a value retained in the channel map store.

The duplex channel conveniently includes a reception buffer for storing received bursts, an output buffer for storing regenerated frames and frame regeneration means for transferring bytes from the reception buffer to the output buffer and for incorporating blank slots in accordance with synchronisation markers contained in said received bursts to reconstitute the specified frames.

Preferably the duplex channel also includes a slot control counter operatively linked to the channel map store to control a frame gate to pass either bytes from the reception buffer to the output buffer or to pass blank slots to the output buffer and a synchronisation detector for synchronising the count of the slot control counter with synchronisation bytes provided by the reception buffer wherein said synchronisation detector is responsive to output of the frame gate.

The TDMA circuitry conforms to the requirements of the TDMA system. In particular the interface circuitry of this invention is compatible with the TDMA system disclosed in our earlier patent application as follows:

|        | APPLICATION NUMBER | APPLICATION DATE  |
|--------|--------------------|-------------------|
| EPO    | 84306111           | 6 September 1984  |
| Canada | 462307             | 31 August 1984    |
| Japan  | 84-188765          | 7 September 1984  |
| USA    | 647441             | 5 September 1984  |

In this specification references to "our earlier application" means the applications specified above.

Our earlier application is characterised in that the communication, in both directions, takes the form of a sequence of traffic bursts wherein each traffic burst includes a marker for synchronisation. It is a particular feature that each active outstation utilises synchronisation markers only in its own bursts. On receipt of a burst an active outstation initiates a pre-set delay and it returns a burst to the node. The node has control of all the outstations and it adjusts each pre-set delay so that bursts received at the node are in the correct sequence.

The outstations require clocks which are used, in conjunction with the markers, to keep synchronisation. As described in our earlier application, the node has control of the synchronisation of the system because (a) all clocks are derived from a master clock at the node, (b) the phasing of the clocks is fixed by synchronisation markers transmitted by the node and (c) the pre-set delays are adjusted by the node.

The outstations of our earlier application are synchronised to transmit in turn. Since it is unwise to rely on perfect adjustment the synchronisation is designed with gaps to reduce the occurrence of overlaps. There will be large gaps when outstations do not wish to transmit (and there will be complete silence when no outstation wishes to transmit). Thus the reception at the node has a discontinuous burst structure.

As our earlier application points out the information bearing transmissions from the node have a similar discontinuous burst structure but clocks dependant on the node would cease to function during gaps and this could have an adverse effect on system performance. It is, therefore, desirable that the node generates a randomised pseudo-signal which is used to fill the gaps between information-containing bursts. Thus the transmission from the node has a discontinuous burst structure in respect of the information bearing content but the discontinuities are filled with timing signal whereby dependant clocks are kept in adjustment.

BRIEF DESCRIPTION OF THE DRAWINGS

One embodiment of the invention will now be described by way of example with reference to the accompanying drawings, in which:

FIG. 2 is a diagram of an outstation,

FIG. 3 is a diagram of the node, and

DETAILED DESCRIPTION

Figure 1:
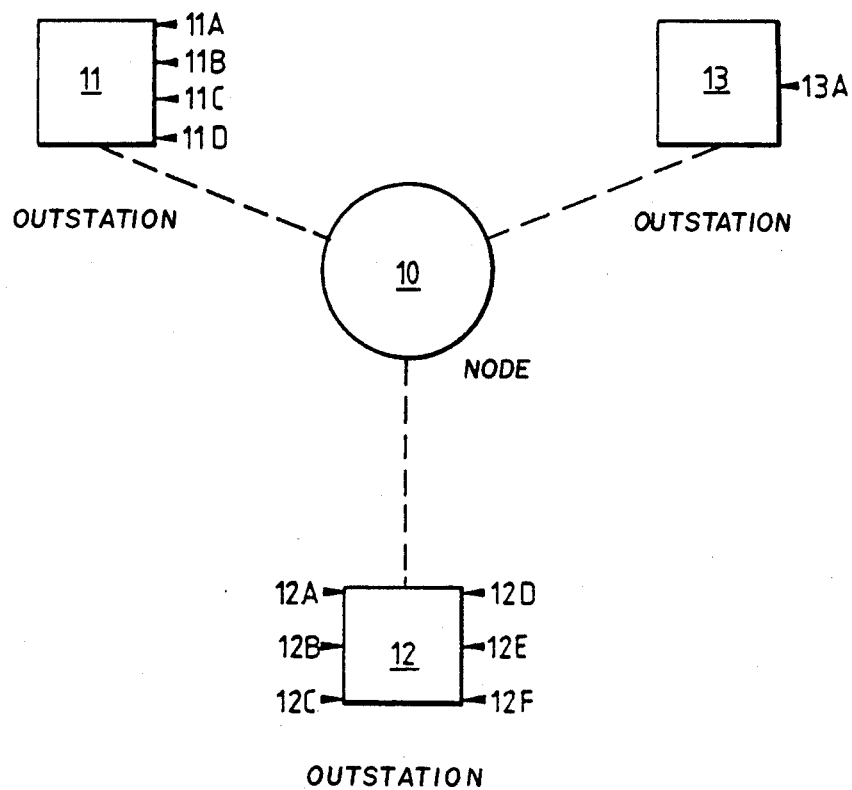
FIG. 1 illustrates a radio network showing a node and some outstations.

The multipoint radio system illustrated in FIG. 1 comprises a node which transmits to a plurality of outstations on one frequency and receives from all the outstations on one frequency. Each outstation is connected to, and provides service for one or more customers. A commercial system could provide service for up to 256 customers distributed among 50–70 outstations; these numbers could be reduced if one of the customers provides a very high traffic load. (A greater number of outstations increases the cost thereof but decreases the distances between the outstations and their customers so reducing the costs of wiring. The optimum for any system is a compromise based upon the geographical distribution of the customers).

FIG. 1 shows three of the outstations (11, 12, and 13) in communication with a node 10. The outstations include interface circuits in the form of terminal cards each of which handles the traffic for a single customer. Outstation 11 has four terminal cards 11A–11D; outstation 12 has six terminal cards 12A–12F and outstation 13 has only one terminal card 13A. Clearly FIG. 1 does not indicate the full extent of a commercial system but it makes the point that there are a plurality of outstations some, and perhaps all, of which serve a plurality of terminal cards. The terminal cards provide ports for the connection of external stations, eg stations which are operated by customers.

It is emphasised that different customers, requiring different services, would require different forms of terminal card. This invention is specifically concerned with the terminal cards which provide an interface for a PCM multiplex. Each such card provides an interface for one PCM multiplex; each multiplex needs its own card. Other customers, e.g. single channel customers, would require different cards. Any TDMA system may include a variety of different types of card. Thus the TDMA system provides interchangeable access for customers with different requirements because the different cards convert different external formats into a common TDMA format.

The system operates in frames of about 10 ms duration and each frame consists of about 8000 bytes of which about 2000 are often required for system information, i.e. 6000 are usually available for traffic. When transmitting, a customer needs 100 bytes in each frame or up to 4000 bytes in each frame for a customer with many audio channels so that a maximum of 60 customers could use the system simultaneously. It is possible to connect up to 256 small scale customers to the system which means that, at most, only about 20 percent of the customers can use the system at the same time. It therefore follows that idle customers cannot have access to traffic slots and a customer has to be allocated to a traffic slot on changing from an idle to an active state. If a large scale customer is included in the system it is necessary to reduce the number of small scale customers. It is also possible for a priority customer to be given permanent access to the TDMA system.

An arrangement, suitable at the outstations, will now be described with reference to FIG. 2.

The outstation comprises an antenna 40 which is used in both send and receive modes. In the receive mode the antenna 40 picks up signals from the node and passes them to receiver 42 via coupler 41. Receiver 42 performs all the usual receiver functions and it passes the demodulated and regenerated traffic to common interface 47 via line 46. Receiver 42 also recovers a clock from the incoming signal and the clock passes, on line 45, to interface 47.

In the send mode transmitter 44 is connected to antenna 40 via burst switch 43 and coupler 41. The transmitter obtains its data from interface 47 via line 51. Burst switch 43 is controlled from the interface via line 48. The burst switch 43 is normally open and in this orientation the signal from the transmitter does not reach the antenna 40. When closed, burst switch 43 allows the signal to reach the antenna 40 whence it is radiated to the node.

Interface 47 is adapted to contain terminal cards 50A to 50E each of which, as mentioned above, handles the traffic for one customer. Because the terminal cards 50A–50E are connected to interface 47 each receives all the signal and a clock. Each can provide traffic for transmission and control burst switch 43.

(Card 50A, as well as serving its customer, also acts as an outstation card to provide radio information to the node and to receive control signals for any radio functions controlled from the node).

The identity of each card is (adjustably) hard wired as part of interface 47. Thus in case of a fault, an old card can be removed and a new card inserted.

Each terminal card 50 is connected to its customer's equipment but these connections are not shown in FIG. 2.

As shown in FIG. 3, the node comprises an antenna 60 which is used in both send and receive modes. In the receive mode it picks up signals from all the outstations and passes them to receiver 62 which demodulates and regenerates the data which is passed to the common interface 64 on line 70. The receiver 62 also derives a clock from the received signal and this derived clock is passed to interface 64 on line 71.

Traffic for transmission passes from the interface 64 to transmitter 63 and then to antenna 60.

Since the node handles traffic for all the customers it includes terminal cards 66 and it requires a card for each active channel. It also includes a system card 65 for timeslot zero and a generator 67 for pseudo-random signals to fill in any gaps in transmission.

The node also includes master clock 69 and microprocessor 68.

In addition, the terminal cards 66 are connected to a telecommunications network so that traffic received by the cards 66 can be passed on to the destination. If two customers of the system wish to communicate with one another their cards are interconnected via the telecommunications network.

All signals related to system information are handled via the microprocessor 68. It should be noted that the microprocessor 68 has direct control of system card 65 and all the terminal cards 66. Microprocessor 68 also has control, via system card 65 and the radio, of all the idle cards (i.e. cards in the outstations synchronised to system card 65 at the node) at all the outstations.

Figure 4:
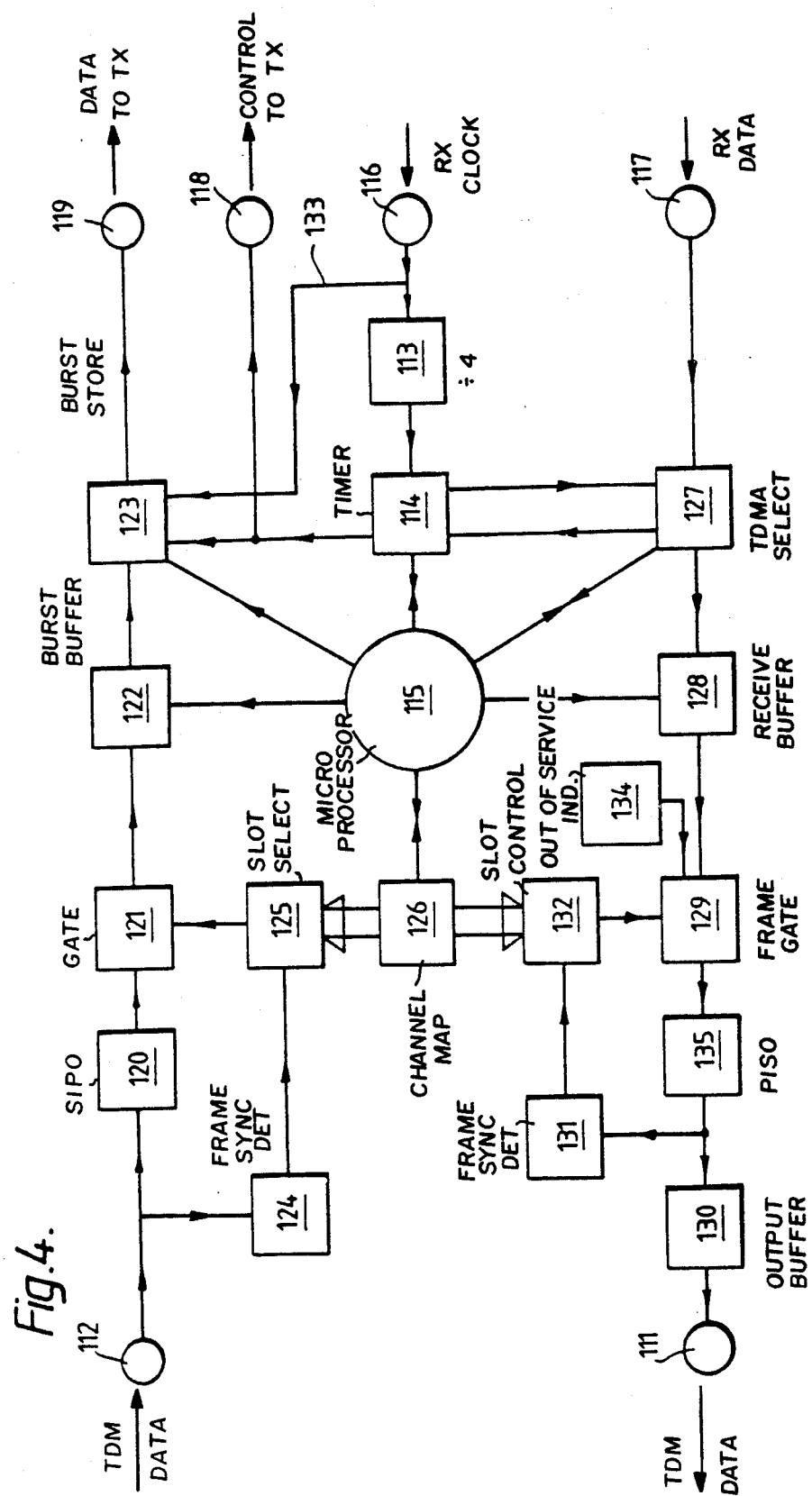
FIG. 4 is a block diagram illustrating the major functions of the cards according to this invention and included in FIGS. 2 and 3.

An interface circuit adapted to co-operate with the transmitter and receiver of an outstation as shown in FIG. 2 and a node as shown in FIG. 3 is illustrated in FIG. 4. The interface circuit corresponds to cards 50 of FIG. 2 and cards 66 of FIG. 3.

The interface circuit has two ports, 111 and 112, which provide connections to the private exchange of a customer, said exchange using a time division multiplex operational node which will be described below. The card also has four ports, 116, 117, 118 and 119, which provide connections to the transmitter and receiver of the outstation. More specifically the ports perform the following functions:

PORT 112 receives traffic, in multiplex form, from the customer's exchange;
PORT 111 outputs traffic, in multiplex form, to the customer's exchange;
PORT 116 receives clock signals from the receiver of the outstation;
PORT 117 receives traffic from the receiver of the outstation;
PORT 118 sends control signals to the transmitter of the outstation;
PORT 119 sends traffic to the transmitter of the outstation.

Before describing the functions of the card the format of the multiplex will be defined.

The multiplex takes the form of a frame which contains 32 slots each adapted to contain a byte, i.e. the eight bits which specify the value of a speech sample. In accordance with conventional practice the multiplex frame lasts for 125 ?s. Out of each frame one slot, i.e. "slot 0" contains a synchronisation marker which enables exchanges and demultiplexers to synchronise. In addition slot 16 contains signal information which is needed by the exchanges. (It should be understood that this is a conventional frame in telecommunications. The invention will also function with other frame formats.)

The format just identified provides for thirty speech-/data channels; in public switched networks it is used for this purpose. However a customer may only want to use a smaller number of lines, e.g. five. If the customer is using a private exchange which employs time division multiplex, it is convenient to retain this mode for communication to the public switched network. This is achieved by providing a channel using the conventional 32 slots-per-frame but only utilising 5 of the slots for traffic. The five slots can be located anywhere within the frame, e.g. slots 3, 11, 13, 19 and 25 could be used (although it might be more convenient to use adjacent slots, e.g. 7 to 11). In any case slots 0 and 16 would be included to provide sync and signalling information (making seven slots total). The unused slots (25 in number) are filled with "out-of-use" markers to facilitate processing.

It will be appreciated that the multiplex format described above actively limits each customer to a specified number of slots. If the customers were allowed to exceed this limit public service exchanges could be overloaded and/or other customers could be unfairly affected. If the link between the customer and the exchange is provided by a time division multi-access system it is necessary to convert the continuous multiplex system described above to the burst-mode of the TDMA. The interface device promotes this conversion. The TDMA has a cycle time of 10 ms. Since each multiplex frame last for 125 ?s this means that each TDMA cycle must carry 80 multiplex frames. For a total of seven slots per frame the customer needs 560 bytes in each TDMA cycle.

As stated above the device includes port 112 adapted for connection to a customer's exchange to receive multiplexed signals in the format described above. The port 112 is connected to bit serial/bit parallel converter 120 which is connected to burst store 123 via gate 121 and burst-buffer 122. The output of burst store 123 is connected to burst output port 119. Frame sync detector 124 and slot selector 125 are connected in parallel with the converter 120. The output of slot selector 125 is connected as the control of gate 121. Slot selector 125 is connected to channel map 126 which stores identifications of the multiplex slots in use; for the example given above channel map 126 stores representations of the integers 0, 3, 11, 13, 16, 19 and 25.

The interface also includes a duplex channel for receiving traffic from the TDMA system and providing it to the customer's exchange. This channel comprises TDMA selection means 127 having its input connected to port 117 and its output connected to reception buffer 128. PCM output port 111 is connected to receive output from output buffer 130 which receives its input through parallel/serial converters 135 from either out-of-service indicator 134 or from reception buffer 128 in accordance with the setting of frame-gate 129. Frame gate 129 is controlled by slot control 132 which is connected to channel map 126.

The interface also contains items to perform TDMA functions (as described in BT patent case A22959). These items are port 116 for receiving a clock signal from the receiver of the outstation. Since the frequency of this slot signal is inconveniently high for internal functions port 116 is connected to divider 113 which divides the frequency by four. Port 116 is also connected, via clock-line 133, to burst store 123 so that this store receives unmodified TDMA clock. The timer 114 operates on a cycle equal to the period of the TDMA and the zero of the cycle is adjusted to correspond to the reception of each burst intended for the interface device. The timer 114 is connected to the burst store 123, microprocessor 115, selection means 127 (as described in BT case A22959).

The operation of the device will now be described; the discription will concentrate on the compatability with PCM-multiplex. Description of TDMA functions will be minimised since the preferred TDMA is described in our earlier cases.

PCM signals are accepted at input port 112 and converted into bit-parallel form in converter 120. Frame sync (i.e. the bit sequence in slot 0) is detected in detector 124 which provides a sync signal to slot selector 125 at the start of each multiplex frame. Thus the selector 125 is enabled to count the slots whereby the count in selector 125 corresponds to the slot in converter 120. Slot selector 125 is connected to channel map 126 which contains data representations defining the meaningful slots of the multiplex frame. When the count current in selector 125 matches any one of the "mapped" slots stored in channel map 126, selector 125 actuates gate 121 with the result that the byte in converter 120 is transferred to storage in input buffer 122. Thus buffer 122 accumulates all the meaningful slots over a number of frames.

It is emphasised that the synchronisation slots are selected by selector 125 and buffer 122 preserves chronological sequence. Thus the original multiplex frame structure is inherent in the stored data representations; no additional multiplex synchronisation is provided (and none is necessary).

The input to buffer 123 operates in synchronisation with, and indeed as part of, the input time division multiplex system. The output of buffer 123, which operates as part of the TDMA system, will now be described.

The microprocessor 115, once in each TDMA cycle, activates burst-buffer 122 to transfer all its content to burst store 123. The microprocessor 115 is operatively connected to timer 114 which is synchronised to the TDMA cycle so that this transfer is made just before a burst is due for transmission.

As mentioned above the TDMA cycle has a duration equal to 80 multiplex frames. Thus the transfer occurs one for every 80 multiplex frames. Each multiplex frame contains one slot for each speech channel plus one slot for sync (i.e. slot 0) and one slot for signalling (slot 16). In the example given above five speech channels were assumed to be utilised and this gives seven bytes per multiplex frame so that 560 bytes are transferred at each cycle. Whilst it is important that the (POM frame):(TDMA cycle) ratio be kept at 80:1 there is no need for explicit synchronisation between the multiplex and the TDMA.

After transfer of the 480 bytes to the burst store, the microprocessor adds the bytes needed to operate the TDMA; for example the microprocessor may add a preamble consisting of three bytes to enable the receiver to establish bit-synchronisation, three bytes for burst identification and one byte each for system identification and customer address. In addition eight bytes (making sixteen) are reserved by microprocessor 115 for TDMA information and a further ten bytes (making twenty-six in all) are left empty to serve as "guard time" to protect against imperfections of TDMA sync. Thus the 560 bytes (transferred from burst buffer 122) are augmented to 586 bytes which constitutes the burst which is stored in burst store 123 until burst transmission time.

The actual transmission is performed under the control of timer 114 and the clock signal on line 133. The timer, by virtue of its synchronisation to the cycle of the TDMA, determines the "window" during which the burst is transmitted. During the "window" the timer 114 provides enable signals to burst store 123 and control port 118.

Which located in an outstation or a node the enable signal on control port 118 passes to the transmitter causing it to adopt the "send" mode for the transmission of the burst. The enable signal to burst store 123 causes it to pass its contents, in bit-serial form to traffic output port 119 at a bit rate controlled by the clock signal received at clock port 116. From port 119 the signal passes to the modulator of the outstation's transmitter whereby said signal is transmitted to the node. It is emphasised that the clock signal from port 116, and hence timer 114, is provided by the TDMA system so that the burst is transmitted at the correct time and at the correct bit rate.

It will be appreciated that the channel just described enables the interface circuit to accept signals in the form of a POM time multiplex, to remove unused slots from these signals and to provide the signals as a burst for the TDMA. The interface includes a duplex channel which reverses this process. This duplex channel will now be described.

The duplex channel receives its traffic from input port 117. During use all the traffic is passed to selection means 127 which is normally in a "disabled" state. For a short period (adjacent to the zero of cyclic timer 114) the selection means 127 is enabled by the timer 114. During this period selection means 127 is responsive to the TDMA synchronisation pattern and to its own address so that it recognises its own incoming burst. On recognition it initiates data capture and it remains enabled until data capture is complete. During data capture it converts the bit-serial input into bit-parallel form and it accepts a fixed number of bytes for storage in reception buffer 128. (Above it was stated that the burst was 580 bytes long when it was transmitted, therefore the "fixed number" is 580. If desired a margin for error may be provided by using a higher fixed number, e.g. 600.)

When data capture is complete the fixed number of bytes is stored in reception buffer 128 and means 127 returns to its "disabled" state. In the next part of the reception cycle microprocessor 115 checks the contents of reception buffer 128. This check comprises verification of the TDMA information whereby correct TDMA performance is checked. This verification includes a check upon, and if necessary correction of, the phase of timer 114. When the TDMA verification is complete the microprocessor 115 deletes the TDMA-related bytes (and any excess bytes acquired as a margin for error) to leave the traffic bytes which, in correct operation, will be identical to the transmitted bytes.

If desired the microprocessor may check the remaining bytes, i.e. the traffic bytes, to conform that "slot 0" occurs regularly and at the correct intervals. This will also identify the first slot in the sequence. Microprocessor 115 stores the identity of the last byte of the previous burst so that it can confirm that the correct sequence is maintained.

(Note. The transmission process arbitrarily chops the continuous flow of traffic bytes into bursts but the sequence is maintained because the last byte of each burst is followed, about 10 ms later, by the first byte of the next burst. The reception process is about to re-establish the continuous flow and the microprocessor 115 has just confirmed that the intended operation is in fact happening. It is, therefore, able to detect malfunctions. If the microprocessor 115 detects frequent errors this suggests system-failure and microprocessor 115 issues an alarm to the engineers.)

When microprocessor 115 has completed all its checks the contents of reception buffer 128 are transferred to multiplex output buffer 130 via frame gate 129 under control of slot control 132 which keeps a count defining the slot position in the output frame. When the count current in slot control 132 matches any one of the "mapped" slots stored in channel map 126 slot control 132 actuates frame gate 129 to select a byte from buffer 128. In all other cases frame gate 129 selects a byte from out of service indicator 134. Thus selected byte passes to output buffer 130 via parallel/bit serial convertor 135.

The output of frame-gate 129 is checked by frame-sync detector 131 which detects "slot 0" and provides a sync signal to slot control 132. This has the effect that the count in slot control 132 is adjusted so that the "zero count" occurs when bytes equivalent to slot 0 are transferred from reception buffer 128. Thus the correct frame format is established in output buffer 130.

Output buffer 130 provides its output, in bit-serial form at the rate of the PCM multiplex to PCM output port 111. Thus the required multiplex format is provided as output after passage through a TDMA system.

It is emphasised that the TDMA operates as described in our earlier patent application and customers can be allocated burst time as needed. Modification of the TDMA pattern may also be appropriate in certain circumstances, e.g. a customer with many channels may be allowed permanent access to the TDMA. The unallocated capacity could be shared between customers as described in our earlier applications.

The embodiment described above utilises an unchangeable channel map and a fixed burst length; i.e. the customer has a fixed allocation of channels. There can be a gain of flexibility by modifying the system to permit adjustment of the number of channels (subject to a specified maximum) as needed. In order to make this adjustment possible it is necessary to provide the customer's PABX with means to communicate with the TDMA, e.g. by arranging that the microprocessor 115 has access to slot 16 of the multiplex frame. This enables the microprocessor 115 to request a new burst length over the signal system of the TDMA and to reset channel map 126.

Thus the interface described above makes possible direct connection of multiplexed audio channels using PCM to a (digital) time division access system. Furthermore, in the case of multiplexes having a sufficient proportion of active slots in the frame, the multiplex uses a shorter burst length than the same number of separate audio channels. In this aspect the break even point occurs at 7 channels in a multiplex with 32 frames there being two system slots, i.e. slot 0 for sync and slot 16 for signalling. Thus a simple audio channel requires 80 bytes for audio plus 26 bytes for TDMA purposes, i.e. 106 bytes per frame. Thus 7 such channels require 742 bytes. The equivalent multiplex requires 7 slots for audio plus 2 slots for system which makes 720 bytes for the 80 frames in each burst. The burst also requires 26 bytes giving 746 bytes in all, this is substantially the same time demand for both techniques. The multiplex only requires 1 interface card whereas seven separate channels require 7 cards. If the traffic is provided as a multiplex, the multiplex card of the invention is compatible wereas extra interface equipment would be needed to separate the separate audio channels. (If it were of overwhelming importance to provide maximum flexibility in the handling of the seven audio channels then separate handling might be preferred.)

Where less than seven channels are used the separate channels give a shorter total burst time than the multiplex but, if the traffic were required as a multiplex then the invention provides compatibility.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A communications system comprising a time division multi-access (TDMA) system having a plurality of outstations and a nodal station, in which the said stations include a first station connected to a first user via a first time division multiplex (TDM) link and a second station connected to a second user via a second TDM link, wherein the users are assigned only certain predetermined defined slots within a TDM frame, the first station includes interface means, said interface means having a first channel map store for containing data identifying the certain predetermined defined slots, and said interface means being arranged to select from received TDM signals data from all of the said slots identified by the contents of the first channel map store and to concatenate that data with TDMA information to produce a TDMA burst, and the second station has interface means, said interface means having a second channel map store and being arranged to extract the data from the received TDMA burst, to generate a TDM frame structure and to insert the data into respective slots thereof identified by the contents of the second channel map store.

2. A communications system according to claim 1 in which the first station is an outstation and the second station is the nodal station.

3. A communications system according to claim 2 in which the defined slots in the first and second TDM links are the same slots thereby providing a transparent link between the two users.

4. A communications system according to claim 1 or 2 or claim 3 in which the TDM links are duplex links, the interface means of the second station being arranged to select from received TDM signals data from all of the said defined slots and to concatenate that data with TDMA information for inclusion in a transmission to the outstation and the interface means of the first station being arranged to extract the data from the received TDMA burst to generate a TDM frame structure and to insert the data into respective defined slots thereof.

5. A communication system according to claim 1 or 2 or 3 in which each TDM frame includes a synchronisation slot which is not a defined slot, the interface means of the second station being arranged to insert synchronisation information into the synchronisation slot.

6. A communications system according to claim 4 in which each TDM frame includes a synchronisation slot which is not a defined slot, the interface means of each station being arranged to insert synchronisation information into the synchronisation slot of the TDM frame structure generated.

7. Interface means for providing duplex interconnection between an external station operating a plurality of digital channels in a time division multiplex format and a time division multi-access (TDMA) system, wherein said interface means comprises:

(a) a first channel for accepting digital signals in time division multiplex format, the first channel having a channel map store for containing data identifying certain predetermined defined slots of the TDM format, gate means responsive to the data in said channel map store for selecting the defined slots from received frames, and burst forming means for concatenating the selected slots with TDMA information to produce a burst for transmission by a TDMA system;

(b) a second channel for re-constituting signals received via the TDMA system into an assigned time division multiplex format; and (c) TDMA circuitry for participating in the operation of the TDMA system, said TDMA circuitry being operatively connected to items (a) and (b) above to provide synchronisation and compatibility between the signals in said channels and the TDMA system.

8. Interface means according to claim 7, wherein the gate-means comprises a frame-counter responsive to a synchronisation slot in each frame of a received multiplexed signal wherein said frame-counter is operatively connected to (d) a buffer input gate, and (e) said channel map store, in such a manner that the frame-counter activates the buffer input gate to permit the passage of a byte when its count matches a value retained in the channel map store.

9. Interface means according to claim 7 or 8 wherein the second channel includes a reception buffer for storing received bursts, an output buffer for storing regenerated frames and frame regeneration means for transferring bytes from the reception buffer to the output buffer.

10. Interface means according to claim 9, which also includes means for incorporating blank slots in accordance with synchronisation markers contained in said received bursts to reconstitute the specified frames.

11. Interface means according to claim 9, wherein the duplex channel also includes a slot control counter operatively linked to a channel map store to control a frame gate to pass either bytes from the reception buffer to the output buffer or to pass blank slots to the output buffer and a synchronisation detector for synchronising the count of the slot control counter with synchronisation bytes provided by the reception buffer wherein said synchronisation detector is responsive to output of the frame gate.

12. Interface means according to claim 10, wherein the duplex channel also includes a slot control counter operatively linked to a channel map store to control a frame gate to pass either bytes from the reception buffer to the output buffer or to pass blank slots to the output buffer and a synchronisation detector for synchronising the count of the slot control counter with synchronisation bytes provided by the reception buffer wherein said synchronisation detector is responsive to output of the frame gate.

13. Interface means for providing duplex interconnection between an external station operating a plurality of digital channels in a time division multiplex format and a time division multi-access (TDMA) system, wherein said interface means comprises:

(a) a first channel for accepting digital signals in time division multiplex format and providing said signals to a TDMA system;

(b) a second channel for re-constituting signals received via the TDMA system into an assigned time division multiplex format; and (c) TDMA circuitry for participating in the operation of the TDMA system, said TDMA circuitry being operatively connected to items (a) and (b) above to provide synchronisation and compatibility between the signals in said channels and the TDMA system;

said first channel comprising gate means for selecting defined slots from received frames, buffer means for storing said selected slots and burst forming means for concatenating TDMA information with the stored slots to produce a burst;

said gate means comprising a frame-counter responsive to a synchronisation slot in each frame of a received multiplexed signal wherein said frame-counter is operatively connected to (d) a buffer input gate, and (e) a channel map store, in such a manner that the frame-counter activates the buffer input gate to permit the passage of a byte when its count matches a value retained in the channel map store.

14. Interface means according to claim 13 wherein the second channel includes a reception buffer for storing received bursts, an output buffer for storing regenerated frames and frame regeneration means for transferring bytes from the reception buffer to the output buffer.

15. Interface means according to claim 14, which also includes means for incorporating blank slots in accordance with synchronisation markers contained in said received bursts to reconstitute the specified frames.

16. Interface means according to claim 14, wherein the duplex channel also includes a slot control counter operatively linked to said channel map store to control a frame gate to pass either bytes from the reception buffer to the output buffer or to pass blank slots to the output buffer and a synchronisation detector for synchronising the count of the slot control counter with synchronisation bytes provided by the reception buffer wherein said synchronisation detector is responsive to output of the frame gate.

* * * * *